(12) United States Patent
Chen

(10) Patent No.: US 9,503,597 B1
(45) Date of Patent: Nov. 22, 2016

(54) IMAGE CAPTURE METHOD AND IMAGE CAPTURE AND SYNTHESIS METHOD

(71) Applicant: TECO IMAGE SYSTEMS CO., LTD., Taipei (TW)

(72) Inventor: Ko-Meng Chen, Taipei (TW)

(73) Assignee: TECO IMAGE SYSTEMS CO., LTD., Taipei (TW)

( * ) Notice: Subject to any disclaimer, the term of this patent is extended or adjusted under 35 U.S.C. 154(b) by 0 days.

(21) Appl. No.: 14/884,025

(22) Filed: Oct. 15, 2015

(30) Foreign Application Priority Data

Jul. 29, 2015 (TW) .............................. 104124486 A

(51) Int. Cl.
G06F 3/12 (2006.01)
H04N 1/04 (2006.01)
H04N 1/00 (2006.01)
H04N 1/03 (2006.01)

(52) U.S. Cl.
CPC ...... H04N 1/00822 (2013.01); H04N 1/00525 (2013.01); H04N 1/03 (2013.01); H04N 1/04 (2013.01)

(58) Field of Classification Search
CPC ..................... H04N 1/00822; H04N 1/00525; H04N 1/03; H04N 1/04
USPC .................. 358/1.1, 1.2, 1.15, 474, 488, 496
See application file for complete search history.

(56) References Cited

U.S. PATENT DOCUMENTS

| 5,729,008 A * | 3/1998 | Blalock ................. G01S 3/7865 250/208.1 |
| 7,539,599 B2 * | 5/2009 | Hasegawa .............. G03G 15/55 700/10 |
| 2001/0048475 A1 * | 12/2001 | Shiomi .............. H04N 5/23248 348/208.99 |
| 2007/0273653 A1 * | 11/2007 | Chen ...................... G06F 3/1415 345/166 |
| 2008/0174832 A1 | 7/2008 | Ueno et al. |
| 2011/0234815 A1 * | 9/2011 | Zahnert .................. G06K 9/228 348/207.1 |
| 2014/0062881 A1 * | 3/2014 | Solomon ................ G09G 5/006 345/158 |

FOREIGN PATENT DOCUMENTS

| CN | 1801877 A | 7/2006 |
| CN | 102170513 A | 8/2011 |
| JP | 2002-204342 A | 7/2002 |
| JP | 2010-154088 A | 7/2010 |
| JP | 2012-156983 A | 8/2012 |
| TW | 399388 B | 7/2000 |
| TW | 201230762 A1 | 7/2012 |
| WO | 2015/104236 A1 | 7/2015 |

* cited by examiner

*Primary Examiner* — Gabriel Garcia
(74) *Attorney, Agent, or Firm* — Kirton McConkie; Evan R. Witt

(57) ABSTRACT

An image capture method includes the following steps. Firstly, an image capturing device including a line image sensor and an optical mouse sensor is provided. Then, an image capturing resolution is provided. Then, the optical mouse sensor starts counting, and the image capturing device is moved along a specified direction. Then, a sampling target value along the specified direction is acquired. Then, the line image sensor acquires at least one temporary image. Then, each temporary image is correlated with a temporary target value according to a counting result of the optical mouse sensor. Then, an absolute value of each temporary target value minus the sampling target value is calculated, and the temporary image corresponding to the minimum absolute value is determined as a to-be-synthesized image. Consequently, the overall volume of the image capturing device is reduced, and the capturing performance is optimized.

15 Claims, 8 Drawing Sheets

IMAGE CAPTURE METHOD AND IMAGE CAPTURE AND SYNTHESIS METHOD

CROSS-REFERENCE TO RELATED APPLICATION

This application claims priority from Taiwan Patent Application No. TW104124486, filed on Jul. 29, 2015, the entire contents of which are incorporated herein by reference for all purposes.

FIELD OF THE INVENTION

The present invention relates to an image processing method, and more particularly to an image capture method and an image capture and synthesis method.

BACKGROUND OF THE INVENTION

In the modern societies, people are increasingly dependent on handheld devices such as smart phones or tablet computers. Consequently, the demands on digitalized documents become stronger. After paper-type documents are digitalized through an imaging capturing process such as a scanning process or photographing process, the documents are converted into digital files.

Generally, in case that the imaging capturing process is the scanning process, the imaging quality is better. Under this circumstance, the characters in the image can be recognized more easily. Nowadays, various kinds of scanners have been introduced into the market. For example, the widely-used scanners include flatbed scanners or handy scanners.

However, although the handy scanner is portable, the volume of the handy scanner is too large to be accommodated within the user's pocket. During the image capturing process, the handy scanner uses a positioning wheel to define the coordinate system. Since the positioning wheel occupies a lot of space, the overall volume of the handy scanner is large.

Therefore, there is a need of providing an image capture method and an image capture and synthesis method in order to reduce the volume of the image capturing device and solve the above drawbacks.

SUMMARY OF THE INVENTION

An object of the present invention provides an image capture method and an image capture and synthesis method in order to solve the drawbacks of the conventional technologies.

Another object of the present invention provides an image capture method and an image capture and synthesis method. Since the image capture method uses the line image sensor to capture images and uses the optical mouse sensor to achieve the counting and positioning purposes, the overall volume of the image capturing device is reduced. Under this circumstance, the image capturing device is further developed toward miniaturization.

A further object of the present invention provides an image capture method and an image capture and synthesis method. The counting result of an optical mouse sensor and the number of temporary images captured by a line image sensor are subjected to a motion algorithm, and specified temporary images are determined as the to-be-synthesized images. Consequently, the capturing performance is optimized according to the properties of the optical mouse sensor. Under this circumstance, the efficacy of the optical mouse sensor is effectively employed, and limitation of the optical mouse sensor is reduced.

In accordance with an aspect of the present invention, there is provided an image capture method. The image capture method includes the following steps. In a step (a), an image capturing device is provided, wherein the image capturing device comprises a line image sensor and an optical mouse sensor. In a step (b), an image capturing resolution is determined. In a step (c), the optical mouse sensor starts counting, and the image capturing device is moved along a specified direction. In a step (d), a sampling target value along the specified direction is acquired. In a step (e), the line image sensor acquires at least one temporary image. In a step (f), each temporary image is correlated with a temporary target value according to a counting result of the optical mouse sensor. In a step (g), an absolute value of each temporary target value minus the sampling target value is calculated, and the temporary image corresponding to the minimum absolute value is determined as a to-be-synthesized image.

In accordance with another aspect of the present invention, there is provided an image capture and synthesis method. The image capture and synthesis method includes the following steps. In a step (a), an image capturing device is provided, wherein the image capturing device comprises a line image sensor and an optical mouse sensor. In a step (b), an image capturing resolution is determined. In a step (c), the line image sensor starts capturing an initial image, and the optical mouse sensor starts counting. In a step (d), the image capturing device is moved on a to-be-captured medium along a specified direction. In a step (e), an image capturing process is performed. The image capturing process includes steps of: (e1) acquiring a sampling target value along the specified direction, (e2) allowing the line image sensor to acquire at least one temporary image, (e3) allowing each temporary image to be correlated with a temporary target value according to a counting result of the optical mouse sensor, and (e4) calculating an absolute value of each temporary target value minus the sampling target value, and determining the temporary image corresponding to the minimum absolute value as a to-be-synthesized image. Then, a step (f) is performed to judge whether the image capturing process has to be performed again according to the counting result. In a step (g), the initial image and the to-be-synthesized images are synthesized as a resulted image. If a judging result of the step (f) indicates that the image capturing process has to be performed again, the steps (e) and (f) are repeatedly done. Whereas, if the judging result of the step (f) indicates that the image capturing process is not performed again, the step (g) is performed.

In accordance with a further aspect of the present invention, there is provided an image capture and synthesis method. The image capture and synthesis method includes the following steps. In a step (a), an image capturing device is provided, wherein the image capturing device comprises a line image sensor and an optical mouse sensor. In a step (b), an image capturing resolution is determined. In a step (c), an image capturing process is performed. The image capturing process includes steps of: (c1) allowing the optical mouse sensor to start counting and moving the image capturing device along a specified direction, (c2) acquiring a sampling interval along the specified direction according to a ratio of a resolution of the optical mouse sensor to the image capturing resolution, (c3) allowing the line image sensor to periodically acquire one temporary image at a time interval so as to acquire a specified number of temporary images, (c4) allowing the control unit to perform a uniform velocity motion algorithm according to the counting result of the optical mouse sensor and the specified number of temporary images so as to obtain a capturing interval, (c5) allowing each temporary image to be correlated with a temporary count value according to the capturing interval, (c6) dividing the counting result by the sampling interval to obtain a quotient and a remainder and determining plural sampling count values having the same number as the quotient according to the quotient and the sampling interval, and (c7) calculating an absolute value of each temporary target value minus the corresponding sampling target value, and determining the temporary image corresponding to the minimum absolute value as a to-be-synthesized image, so that plural to-be-synthesized images having the same number as the quotient are acquired. Then, a step (d) is performed to judge whether the image capturing process is completed. In a step (e), the plural to-be-synthesized images are synthesized as a resulted image. If a judging result of the step (d) indicates that the step image capturing process is completed, the step (e) is performed. Whereas, if the judging result of the step (d) indicates that the step image capturing process is not completed, the remainder is set as an initial count value of the optical mouse sensor and the step (c) and the step (d) are repeatedly done.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
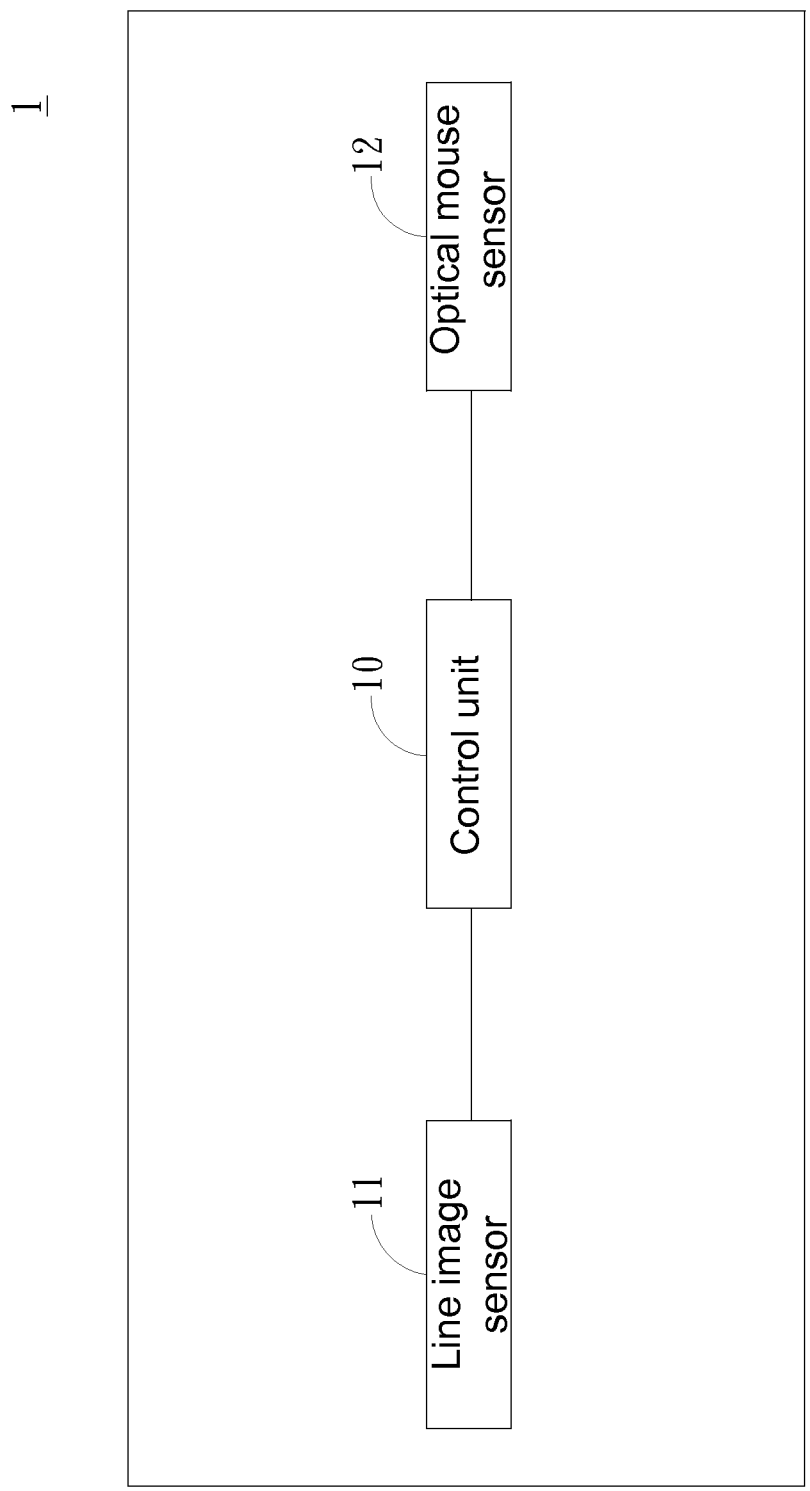
FIG. 1 schematically illustrates the architecture of an image capturing device using an image capture method of the present invention.
Figure 2:
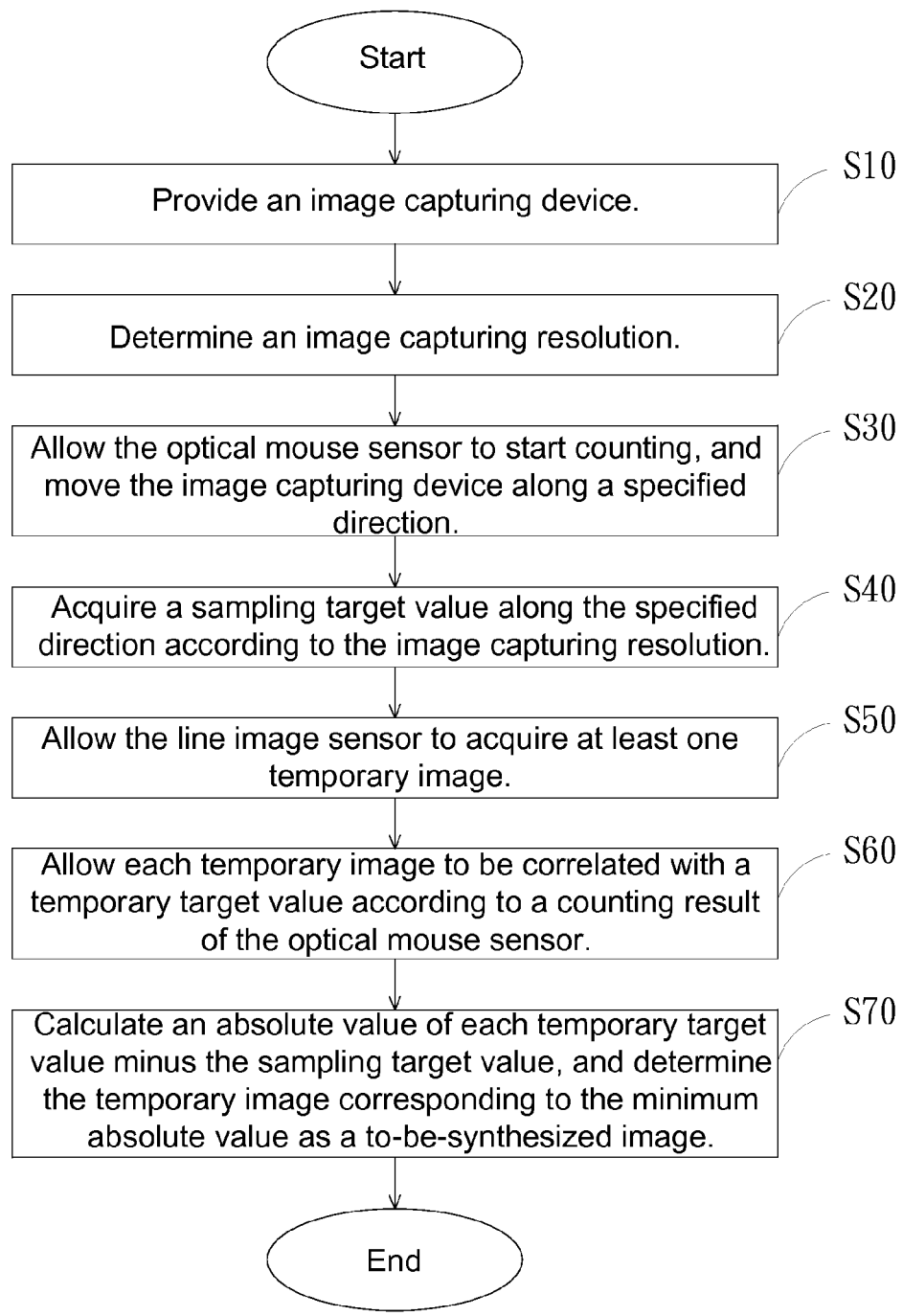
FIG. 2 is a flowchart of an image capture method according to an embodiment of the present invention.

FIG. 1 schematically illustrates the architecture of an image capturing device using an image capture method of the present invention. FIG. 2 is a flowchart of an image capture method according to an embodiment of the present invention. Please refer to FIGS. 1 and 2. The image capture method comprises the following steps. Firstly, in a step S10, an image capturing device 1 is provided. An example of the image capturing device 1 includes but is not limited to a handy scanner. The image capturing device 1 comprises a line image sensor 11 and an optical mouse sensor 12. For example, the line image sensor 11 is a contact image sensor (CIS). Preferably but not restricted, the position refresh rate of the optical mouse sensor 12 is 1 kHz, and the resolution of the optical mouse sensor 12 is 1000~1500 DPI (Dots Per Inch). The line image sensor 11 performs the image capturing process in a line-by-line fashion.

Then, in a step S20, an image capturing resolution is determined. For example, the image capturing resolution is 150, 300 or 600 DPI. Then, in the step S30, the optical mouse sensor 12 starts counting, and the image capturing device 1 is moved along a specified direction. That is, the image capturing device 1 is moved along the scanning direction in a line-by-line fashion. In a step S40, a sampling target value along the specified direction is acquired. For example, the sampling target value along a horizontal direction or a vertical direction is acquired. Preferably but not exclusively, the sampling target value is a sampling coordinate value or a sampling count value. Then, in a step S50, the line image sensor 11 acquires at least one temporary image. Then, in a step S60, each temporary image is correlated with a temporary target value according to a counting result of the optical mouse sensor 12. In a step S70, an absolute value of each temporary target value minus the sampling target value is calculated, and the temporary image corresponding to the minimum absolute value is determined as a to-be-synthesized image.

Since the image capture method of the present invention uses the line image sensor 11 to capture images and uses the optical mouse sensor 12 to achieve the counting and positioning purposes, the overall volume of the image capturing device 1 is reduced. Under this circumstance, the image capturing device is further developed toward miniaturization.

Figure 3:
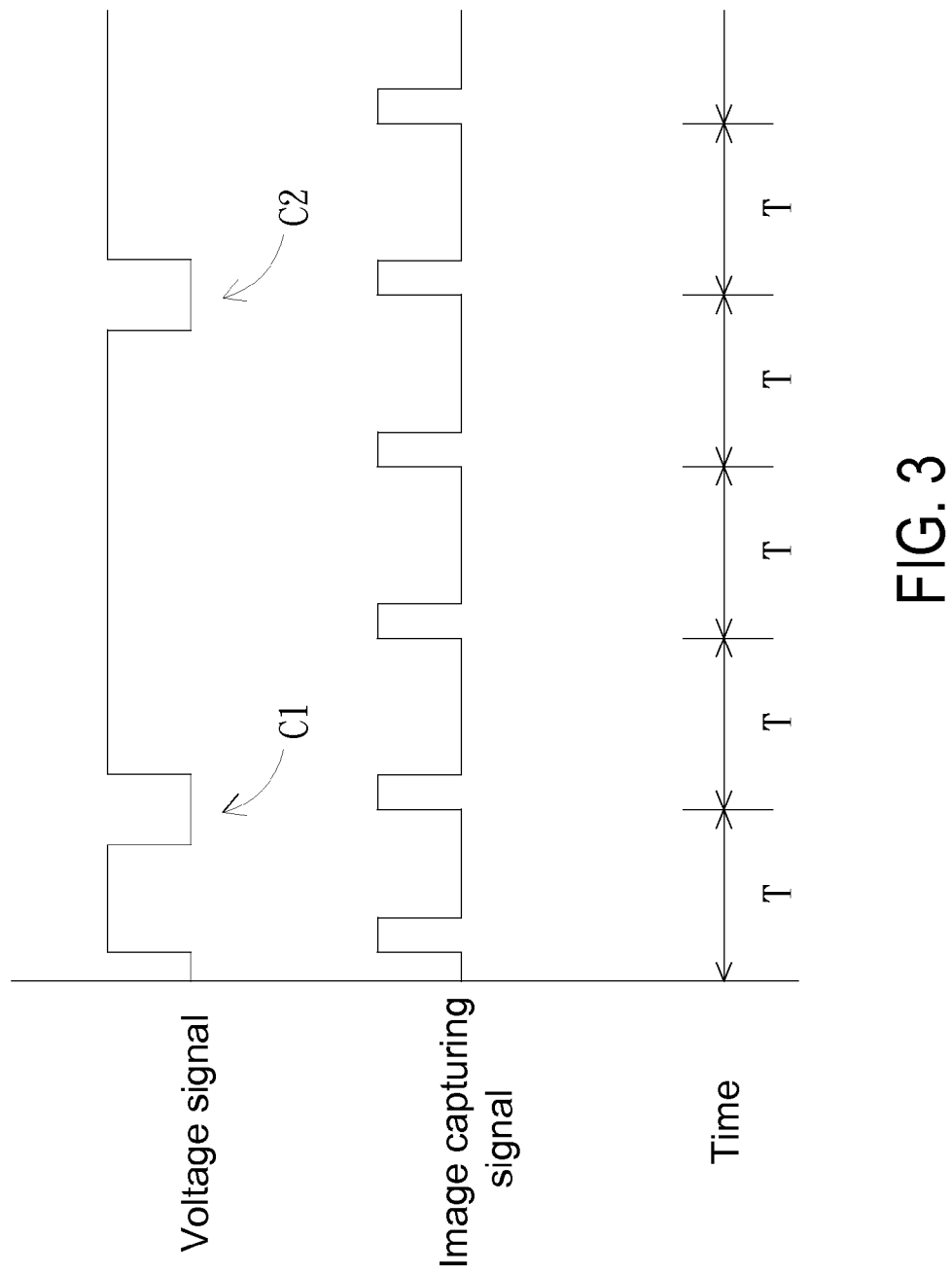
FIG. 3 is a schematic timing waveform diagram illustrating associated signals processed by the image capture method of the present invention.

FIG. 3 is a schematic timing waveform diagram illustrating associated signals processed by the image capture method of the present invention. The signals as shown in FIG. 3 include a positioning signal of the optical mouse sensor 12 and an image capturing signal of the line image sensor 11. Please refer to FIGS. 1, 2 and 3. In the step S50, the line image sensor 11 acquires one temporary image at a time interval T. For example, the time interval T is 0.072 second. Hereinafter, the operations of the image capture method of this embodiment will be illustrated according to following conditions: the time interval T is 0.072, the image capturing resolution of the 300 DPI, and the resolution of the optical mouse sensor 12 is 1000 DPI. In this embodiment, the sampling target value is a sampling coordinate value, and the temporary target value is a temporary coordinate value. In the step S40, the sampling coordinate value along the specified direction is acquired according to the image capturing resolution. Since the image capturing resolution is 300 DPI, the sampling coordinate value along the specified direction is equal to 0.0847 mm.

Moreover, the image capturing device 1 further comprises a control unit 10. The control unit 10 is connected with the line image sensor 11 and the optical mouse sensor 12. The control unit 10 is used to control the operations of the line image sensor 11 and the optical mouse sensor 12, and implement a motion algorithm and an image synthesizing operation. In case that the image capturing signal is in an enabling state, the line image sensor 11 acquires one temporary image. Whereas, in case that the image capturing signal is in a disabling state, the line image sensor 11 does not acquire the temporary image. Since the image capturing device 1 acquires the line images in a line-by-line fashion, the image capturing signal is also a line synchronization signal. Similarly, as shown in FIG. 3, the image capturing signal is in the disabling state at the time interval T.

While the line image sensor 11 acquires the temporary image, the control unit 10 also detects the voltage signal of the optical mouse sensor 12. If the voltage signal of the optical mouse sensor 12 is in a low-level state, the control signal records the number of the temporary images and records the displacement of the image capturing device 1 along the specified direction according to the counting result of the optical mouse sensor 12. Furthermore, the control unit 10 performs a uniform acceleration motion algorithm according to the number of the temporary images and the displacement of the image capturing device 1 along the specified direction. Consequently, the temporary coordinate value corresponding to each temporary image is inferred.

For example, the optical mouse sensor 12 has a first count value C1 corresponding to the low-level state of the voltage signal for the first time, and the optical mouse sensor 12 has a second count value C2 corresponding to the low-level state of the voltage signal for the second time. According to a displacement formula (i.e., S=V×T), the first velocity V1 corresponding to the first count value C1 (e.g., one count) and the second velocity V2 corresponding to the second count value C2 (e.g., four counts) can be calculated by the following formulae:

$$V1=S/T \quad (1)$$

$$V2=4S/3T \quad (2)$$

In the above formulae (1) and (2), V is velocity, T is time interval, and S is displacement of the image capturing device 1 along the specified direction for each count of the optical mouse sensor 12. Moreover, the number of the time intervals T may indicate the number of the temporary images.

After the first velocity V1 and the second velocity V2 are obtained, the acceleration can be obtained according to the acceleration formula:

$$a=(V2-V1)/3T=(4S/3T-S/T)/3T=S/9T^2 \quad (3)$$

According to the above formulae (1), (3) and the displacement formula of the acceleration motion, the displacements of the temporary images after the temporary image corresponding to the first count value C1 can be obtained. For example, the first temporary image after the temporary image corresponding to the first count value C1 has a displacement b1, the second temporary image after the temporary image corresponding to the first count value C1 has a displacement b2, and the third temporary image after the temporary image corresponding to the first count value C1 has a displacement b3. Since the time interval T is known (i.e., 0.072 second) and the resolution of the optical mouse sensor 12 is 1000 DPI, S=0.0254 mm. That is, b1=S+V1×T+0.5×a×T²=0.05221 mm; b2=S+V1×T+0.5×a×4T²=0.08184 mm; and b2=S+V1×T+0.5×a×9T²=0.11430 mm.

In the above formulae, the displacements b1, b2 and b3 indicate the temporary coordinate values along the specified direction. Then, the absolute value of each temporary coordinate value minus the sampling coordinate value is calculated. Especially, the temporary image corresponding to the minimum absolute value is determined as a to-be-synthesized image. For example, |b1−0.0847|=|0.05221−0.0847|=0.03249, |b2−0.0847|=|0.08184−0.0847|=0.00286, and |b3−0.0847|=|0.1143−0.0847|=0.0296. Since 0.00286<0.0296<0.03249, the second temporary image after the temporary image corresponding to the first count value C1 is determined as the to-be-synthesized image.

Figure 4:
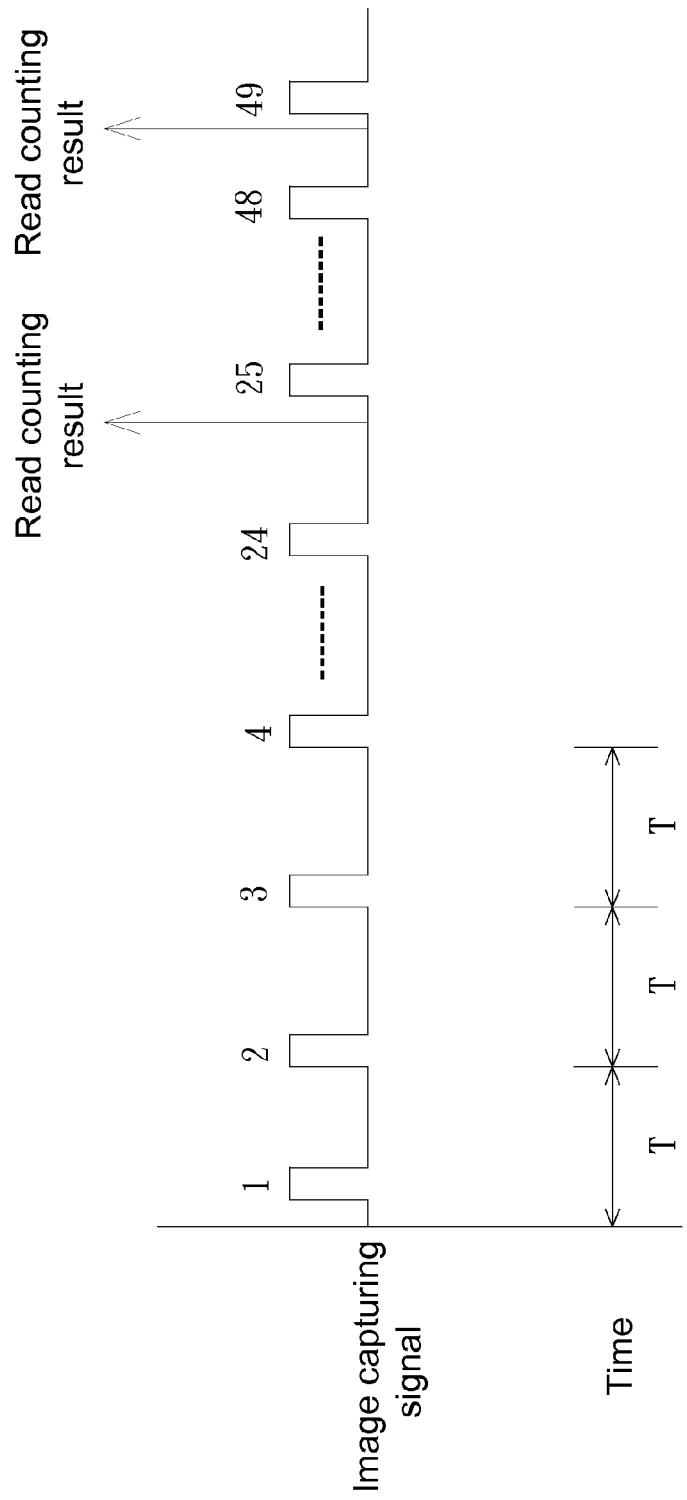
FIG. 4 is another schematic timing waveform diagram illustrating an image capturing signal by the image capture method of the present invention.

In the above embodiment, the control unit 10 acquires the proper number of temporary images by the uniform acceleration motion algorithm. In some other embodiments, the control unit 10 acquires the proper number of temporary images by a uniform velocity motion algorithm. FIG. 4 is another schematic timing waveform diagram illustrating an image capturing signal by the image capture method of the present invention. The image capturing signal is detected by the line image sensor 11. Hereinafter, the operations of the image capture method of this embodiment will be illustrated according to following conditions: the time interval T is 0.072 second, the image capturing resolution of the 300 DPI, and the resolution of the optical mouse sensor 12 is 1500 DPI. In this embodiment, the sampling target value is a sampling count value, and the temporary target value is a temporary count value. In the step S40, the sampling count value along the specified direction is acquired according to a ratio of the resolution of the optical mouse sensor 12 to the image capturing resolution. Since the resolution of the optical mouse sensor 12 is 1500 DPI and the image capturing resolution is 300 DPI, a sampling interval along the specified direction is equal to 5 counts. Moreover, the sampling count value is a multiple of the sampling interval.

In this embodiment, whenever the line image sensor 11 acquires a specified number of temporary images, the control unit 10 performs a uniform velocity motion algorithm according to the counting result of the optical mouse sensor 12 and the specified number of temporary images. Consequently, a capturing interval is obtained. In an embodiment as shown in FIG. 4, the specified number is 24. If the counting result of the optical mouse sensor 12 indicate the displacement along the specified direction is equal to 31 counts, the capturing interval is 31/24=1.2916 according to the uniform velocity motion algorithm. According to the capturing interval (i.e., 1.2916), the control unit 10 can infer the temporary count value corresponding to each temporary image. That is, the temporary count value corresponding to the first temporary image is 1.2916, the temporary count value corresponding to the second temporary image is 2.5832, the temporary count value corresponding to the third temporary image is 3.8748, the temporary count value corresponding to the fourth temporary image is 5.1644, . . . , the temporary count value corresponding to the twenty third temporary image is 29.7068, and the temporary count value corresponding to the twenty-fourth temporary image is 30.9984. Then, the absolute value of each temporary count value minus the sampling coordinate value is calculated. Especially, the temporary image corresponding to the minimum absolute value is determined as a to-be-synthesized image. For example, |1.2916−5|=|−3.7084|=3.7084, |2.5832−5|=|−2.4168|=2.4168, |3.8748−5|=|−1.1252|=1.1252, |5.1644−5|=|0.1644|=0.1644, . . . , |29.7068−5|=|24.7068|=24.7068, and |30.9984−5|=|25.9984|=25.9984. Since 0.1644 is the minimum, the fourth temporary image is determined as the to-be-synthesized image.

The image capture method according to the uniform velocity motion algorithm can be used to capture a large number of temporary images. As mentioned above, the sampling interval along the specified direction is equal to the ratio of the resolution of the optical mouse sensor 12 to the image capturing resolution. That is, one to-be-synthesized image is acquired every five counts. For example, if the sampling count value is 30, the sixth to-be-synthesized image can be acquired. Similarly, the absolute value of each temporary count value minus the sampling coordinate value is calculated, and the temporary image corresponding to the minimum absolute value is determined as the to-be-synthesized image. Since the absolute value 0.2932 corresponding to the twenty-third temporary image is the minimum, the twenty-third temporary image is determined as the sixth to-be-synthesized image.

Figure 5:
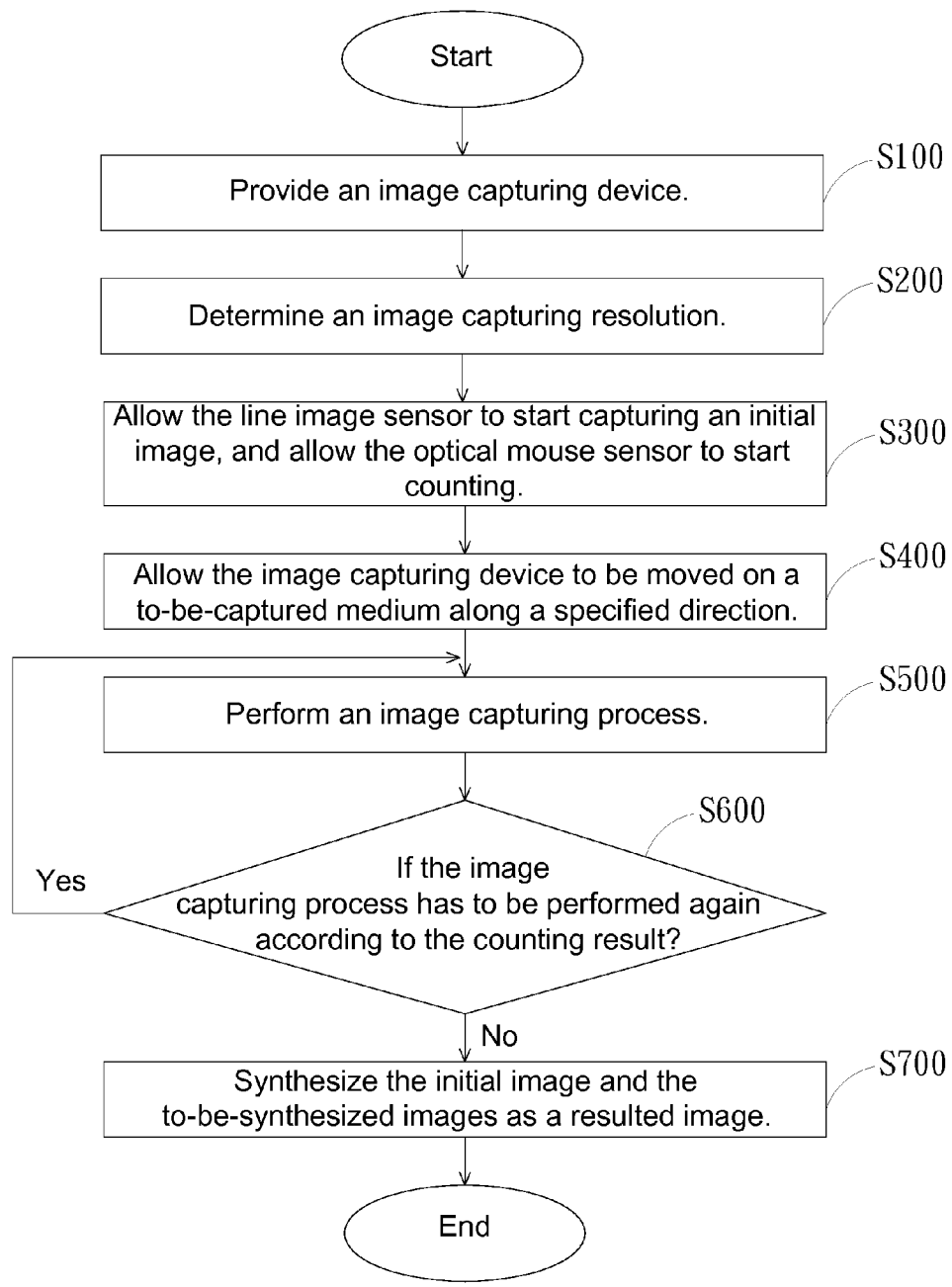
FIG. 5 is a flowchart of an image capture and synthesis method according to an embodiment of the present invention.
Figure 6:
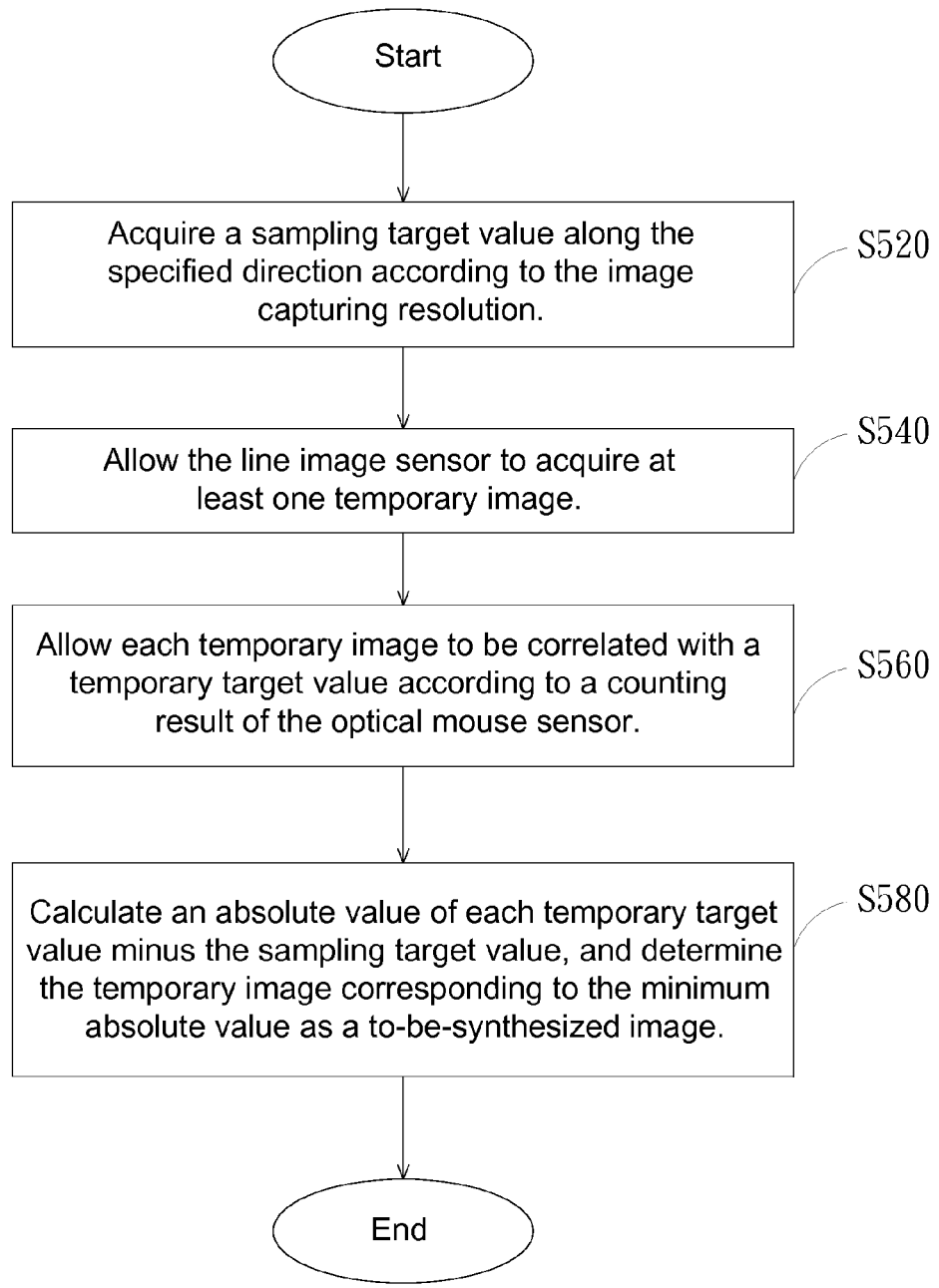
FIG. 6 is a flowchart of the step S500 of the image capture and synthesis method of FIG. 5.

FIG. 5 is a flowchart of an image capture and synthesis method according to an embodiment of the present invention. FIG. 6 is a flowchart of the step S500 of the image capture and synthesis method of FIG. 5. Firstly, in a step S100, an image capturing device 1 is provided. The image capturing device 1 comprises a line image sensor 11 and an optical mouse sensor 12. Then, in a step S200, an image capturing resolution is determined. Then, in the step S300, the line image sensor 11 starts capturing an initial image, and the optical mouse sensor 12 starts counting. Then, in a step S400, the image capturing device 1 is moved on a to-be-captured medium along a specified direction. Then, in a step S500, an image capturing process is performed. Then, the step S600 is performed to judge whether the image capturing process has to be performed again according to the counting result. If the judging condition of the step S600 is satisfied, the step S500 and the subsequent steps are performed again. Whereas, if the judging condition of the step S600 is not satisfied, the step S700 is performed. In the step S700, the initial image and the to-be-synthesized images are synthesized as a resulted image. The result image is the final image that is captured from the image of the to-be-captured medium by the image capturing device 1.

The image capturing process of the step S500 comprises the following steps. In a step S520, a sampling target value along the specified direction is acquired. Then, in a step S540, the line image sensor 11 acquires at least one temporary image. Then, in a step S560, each temporary image is correlated with a temporary target value according to a counting result of the optical mouse sensor 12. In a step S580, an absolute value of each temporary target value minus the sampling target value is calculated, and the temporary image corresponding to the minimum absolute value is determined as a to-be-synthesized image. The steps S520, S540, S560 and S580 are similar to the steps S40, S50, S60 and S70, and are not redundantly described herein. In the image capture and synthesis method of this embodiment, the initial image is firstly captured by the line image sensor 11, and one or more to-be-synthesized image are obtained in the image capturing process S500. The initial image and the one or more to-be-synthesized images are synthesized as the resulted image. In other words, the image capturing process S500 can be performed once or multiple times until the to-be-captured medium is completely captured.

Figure 7:
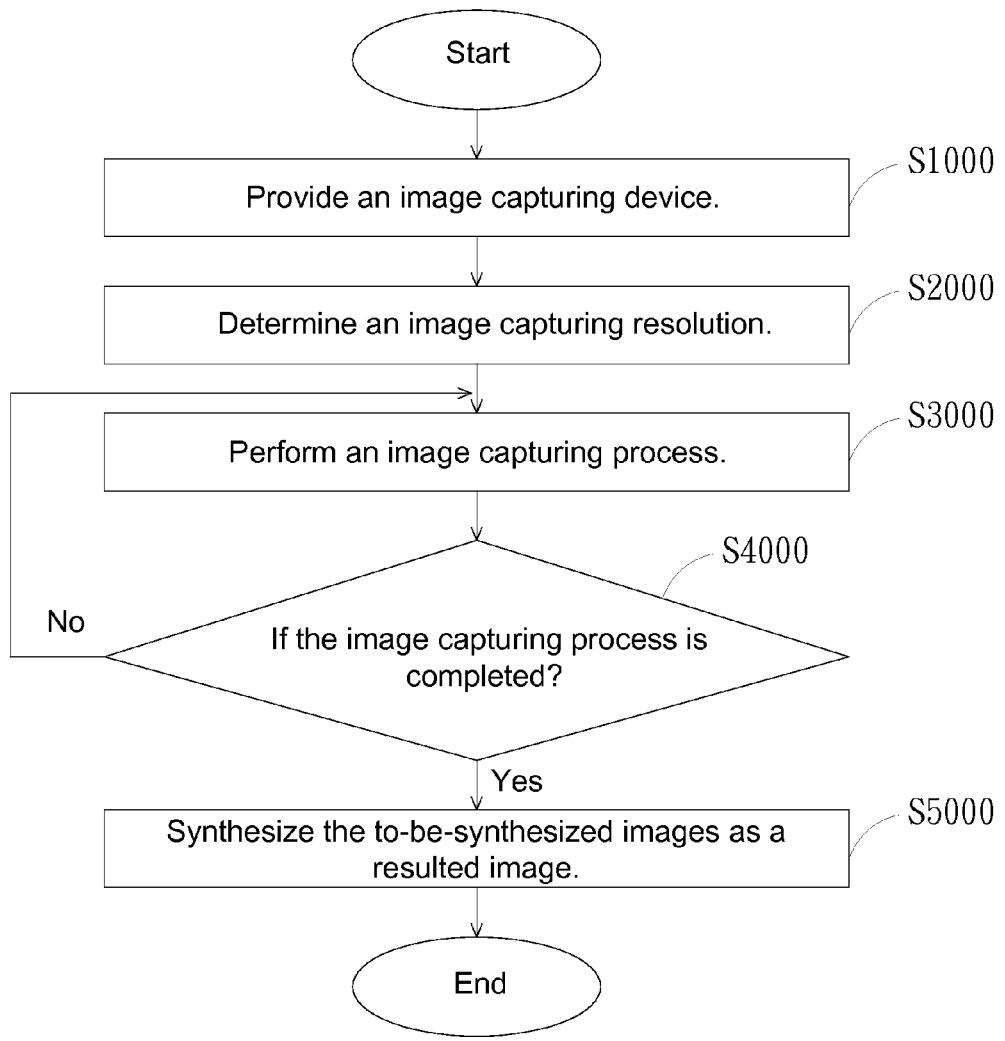
FIG. 7 is a flowchart of an image capture and synthesis method according to anther embodiment of the present invention.
Figure 8:
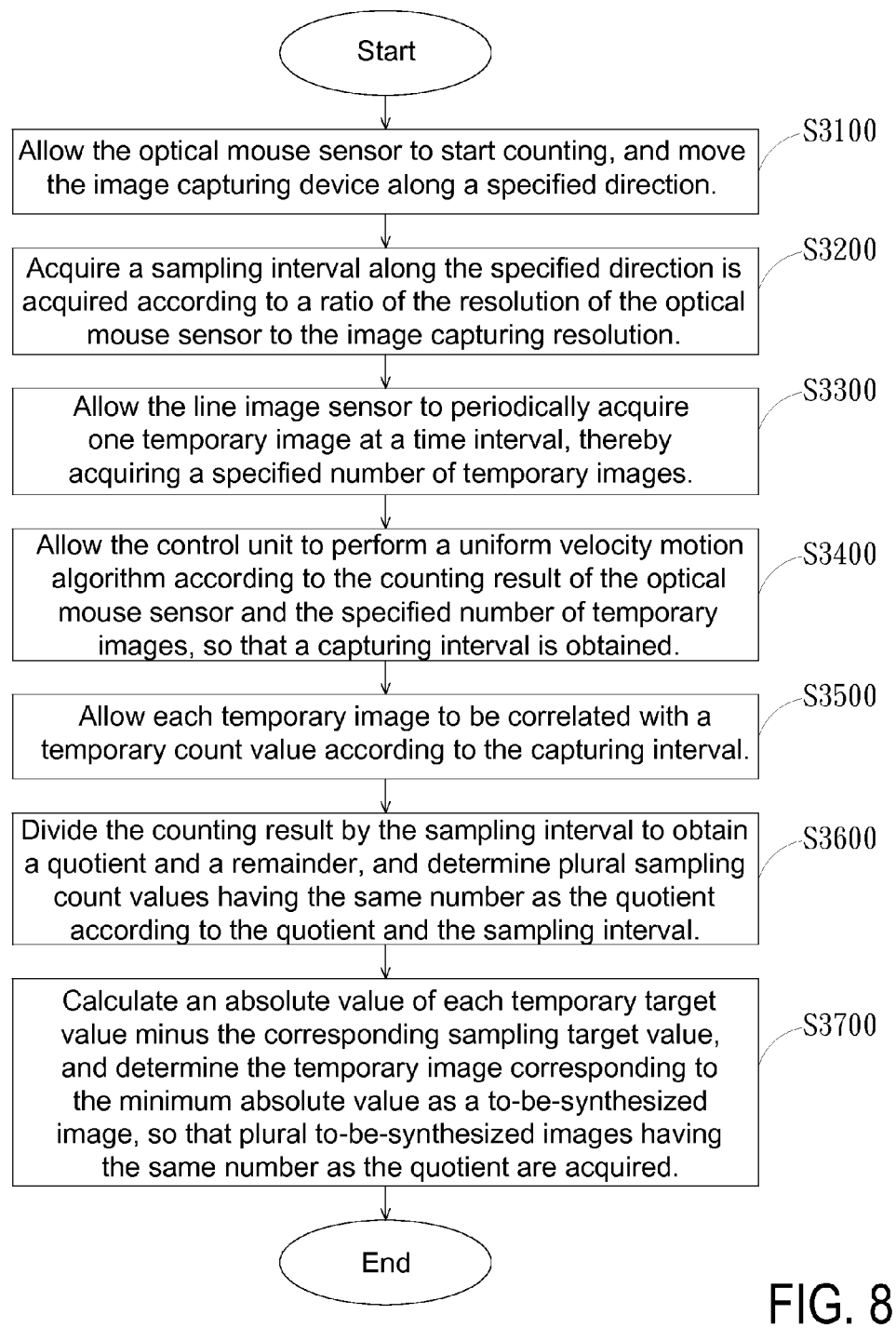
FIG. 8 is a flowchart of the step S3000 of the image capture and synthesis method of FIG. 7.

FIG. 7 is a flowchart of an image capture and synthesis method according to anther embodiment of the present invention. FIG. 8 is a flowchart of the step S3000 of the image capture and synthesis method of FIG. 7. In this embodiment, a uniform velocity motion algorithm is performed. Firstly, in a step S1000, an image capturing device 1 is provided. The image capturing device 1 comprises a control unit 10, a line image sensor 11 and an optical mouse sensor 12. The control unit 10 is connected with the line image sensor 11 and the optical mouse sensor 12. Then, in a step S2000, an image capturing resolution is determined.

For example, the image capturing resolution is 300 DPI. Then, in the step S3000, an image capturing process is performed.

The image capturing process of the step S3000 comprises the following steps. In a step S3100, the optical mouse sensor 12 starts counting, and the image capturing device 1 is moved along a specified direction. In the step S3200, a sampling interval along the specified direction is acquired according to a ratio of the resolution of the optical mouse sensor 12 to the image capturing resolution. The definition of the sampling interval has been mentioned in the above embodiments. In the step S3300, the line image sensor 11 periodically acquires one temporary image at a time interval, thereby acquiring a specified number of temporary images. In a step S3400, the control unit 10 performs a uniform velocity motion algorithm according to the counting result of the optical mouse sensor 12 and the specified number of temporary images, so that a capturing interval is obtained. In a step S3500, each temporary image is correlated with a temporary count value according to the capturing interval. In the step S3600, the counting result is divided by the sampling interval to obtain a quotient and a remainder, and plural sampling count values having the same number as the quotient are determined according to the quotient and the sampling interval. Then, in a step S3700, an absolute value of each temporary target value minus the corresponding sampling target value is calculated, and the temporary image corresponding to the minimum absolute value is determined as a to-be-synthesized image, so that plural to-be-synthesized images having the same number as the quotient are acquired.

After the image capturing process of the step S3000, a step S4000 is performed to judge whether the image capturing process is completed. If the judging condition of the step S4000 is satisfied, a step S5000 is performed. In the step S5000, the to-be-synthesized images are synthesized as a resulted image. Whereas, if the judging condition of the step S4000 is not satisfied, the remainder is set as an initial count value of the optical mouse sensor 12 and the steps S3000 and S4000 are repeatedly done. In an embodiment, the step of judging whether the image capturing process is completed can be implemented by the user. In another embodiment, the step of judging whether the image capturing process is completed can be implemented according to the image captured by the image capturing device 1, the continuous displacement of the image capturing device 1, the voltage signal of the optical mouse sensor 12 or any other appropriate parameter or information.

Hereinafter, the operations of the image capture method of this embodiment will be illustrated according to following conditions: the resolution of the optical mouse sensor 12 is 1000 DPI, the image capturing resolution of the 300 DPI, and the sampling interval is equal to 5 counts. If the counting result is equal to 31 counts and the specified number is 24, the capturing interval is 31/24=1.2916 according to the uniform velocity motion algorithm. In the step S3600, the counting result is divided by the sampling interval to obtain a quotient (=6) and a remainder (=1). Moreover, according to the quotient and the sampling interval, the sampling count values having the same number as the quotient are determined. That is, one to-be-synthesized image is acquired every five counts. Moreover, the six sampling count values are 5, 10, 15, 20, 25 and 30. Consequently, six temporary images corresponding to the six sampling count values are determined as the six to-be-synthesized images.

If the judging condition of the step S4000 is not satisfied, the remainder is set as an initial count value of the optical mouse sensor 12. That is, the initial count value is 1, instead of being zeroed. If the optical mouse sensor 12 is moved for 27 counts along the specified direction when the step S3000 is performed again, the counting result is 28. In the step S3600, the counting result is divided by the sampling interval to obtain a quotient (=5) and a remainder (=3). Similarly, according to the new counting result and the image capture method, another five to-be-synthesized images are obtained. If the judging condition of the step S4000 is not satisfied, the remainder is set as an initial count value of the optical mouse sensor 12. Consequently, the sampling result is more precise and the capturing performance is enhanced.

From the above descriptions, the present invention provides an image capture method and an image capture and synthesis method in order to solve the drawbacks of the conventional technologies. Since the image capture method of the present invention uses the line image sensor to capture images and uses the optical mouse sensor to achieve the counting and positioning purposes, the overall volume of the image capturing device is reduced. Under this circumstance, the image capturing device is further developed toward miniaturization. Moreover, the counting result of the optical mouse sensor and the number of temporary images captured by the line image sensor are subjected to a motion algorithm, and specified temporary images are determined as the to-be-synthesized images. Consequently, the capturing performance is optimized according to the properties of the optical mouse sensor. Under this circumstance, the efficacy of the optical mouse sensor is effectively employed, and limitation of the optical mouse sensor is reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image capture method, comprising steps of:
   (a) providing an image capturing device, wherein the image capturing device comprises a line image sensor and an optical mouse sensor;
   (b) determining an image capturing resolution;
   (c) allowing the optical mouse sensor to start counting, and moving the image capturing device along a specified direction;
   (d) acquiring a sampling target value along the specified direction;
   (e) allowing the line image sensor to acquire at least one temporary image;
   (f) allowing each temporary image to be correlated with a temporary target value according to a counting result of the optical mouse sensor; and
   (g) calculating an absolute value of each temporary target value minus the sampling target value, and determining the temporary image corresponding to the minimum absolute value as a to-be-synthesized image.

2. The image capture method according to claim 1, wherein in the step (e), the line image sensor periodically acquires one temporary image at a time interval.

3. The image capture method according to claim 2, wherein the image capturing device further comprises a control unit, wherein the control unit is connected with the line image sensor and the optical mouse sensor.

4. The image capture method according to claim 3, wherein the sampling target value is a sampling count value, and the temporary target value is a temporary count value.

5. The image capture method according to claim 4, wherein in the step (d), the sampling count value along the specified direction is acquired according to a ratio of a resolution of the optical mouse sensor to the image capturing resolution.

6. The image capture method according to claim 5, wherein whenever the line image sensor acquires a specified number of temporary images, the control unit performs a uniform velocity motion algorithm according to the counting result of the optical mouse sensor and the specified number of temporary images, so that a capturing interval is obtained.

7. The image capture method according to claim 6, wherein the control unit infers the temporary target value corresponding to each temporary image according to the capturing interval.

8. The image capture method according to claim 3, wherein the sampling target value is a sampling coordinate value, and the temporary target value is a temporary coordinate value.

9. The image capture method according to claim 8, wherein in the step (d), the sampling coordinate value along the specified direction is acquired according to the image capturing resolution.

10. The image capture method according to claim 9, wherein while the line image sensor acquires the temporary image, the control unit also detects a voltage signal of the optical mouse sensor, wherein if the voltage signal is in a low-level state, the control signal records a number of the temporary images and records a displacement of the image capturing device along the specified direction according to the counting result of the optical mouse sensor.

11. The image capture method according to claim 10, wherein the control unit performs a uniform acceleration motion algorithm according to the number of the temporary images and the displacement of the image capturing device, so that the temporary coordinate value corresponding to each temporary image is inferred.

12. The image capture method according to claim 1, wherein the image capturing resolution is 150, 300 or 600 DPI, a resolution of the optical mouse sensor is 1000 or 1500 DPI, and the line image sensor is a contact image sensor.

13. An image capture and synthesis method, comprising steps of:
   (a) providing an image capturing device, wherein the image capturing device comprises a line image sensor and an optical mouse sensor;
   (b) determining an image capturing resolution;
   (c) allowing the line image sensor to start capturing an initial image, and allowing the optical mouse sensor to start counting;
   (d) moving the image capturing device on a to-be-captured medium along a specified direction;
   (e) performing an image capturing process, wherein the image capturing process comprises steps of:
      (e1) acquiring a sampling target value along the specified direction;
      (e2) allowing the line image sensor to acquire at least one temporary image;
      (e3) allowing each temporary image to be correlated with a temporary target value according to a counting result of the optical mouse sensor; and
      (e4) calculating an absolute value of each temporary target value minus the sampling target value, and determining the temporary image corresponding to the minimum absolute value as a to-be-synthesized image;
(f) judging whether the image capturing process has to be performed again according to the counting result; and
(g) allowing the initial image and the to-be-synthesized images acquired in the image capturing processes to be synthesized as a resulted image,
wherein if a judging result of the step (f) indicates that the image capturing process has to be performed again, the steps (e) and (f) are repeatedly done, wherein if the judging result of the step (f) indicates that the image capturing process is not performed again, the step (g) is performed.

14. The image capture and synthesis method according to claim 13, wherein in the step (f), a sampling interval is defined according to a ratio of a resolution of the optical mouse sensor to the image capturing resolution, and a quotient of the counting result divided by the sampling interval indicates a total number of times of performing the image capturing process, wherein if the total number of times is not reached, the image capturing process has to be performed again.

15. An image capture and synthesis method, comprising steps of:
(a) providing an image capturing device, wherein the image capturing device comprises a control unit, a line image sensor and an optical mouse sensor;
(b) determining an image capturing resolution;
(c) performing an image capturing process, wherein the image capturing process comprises steps of:
    (c1) allowing the optical mouse sensor to start counting, and moving the image capturing device along a specified direction;
    (c2) acquiring a sampling interval along the specified direction according to a ratio of a resolution of the optical mouse sensor to the image capturing resolution;
    (c3) allowing the line image sensor to periodically acquire one temporary image at a time interval, thereby acquiring a specified number of temporary images;
    (c4) allowing the control unit to perform a uniform velocity motion algorithm according to the counting result of the optical mouse sensor and the specified number of temporary images, so that a capturing interval is obtained;
    (c5) allowing each temporary image to be correlated with a temporary count value according to the capturing interval;
    (c6) dividing the counting result by the sampling interval to obtain a quotient and a remainder, and determining plural sampling count values having the same number as the quotient according to the quotient and the sampling interval; and
    (c7) calculating an absolute value of each temporary target value minus the corresponding sampling target value, and determining the temporary image corresponding to the minimum absolute value as a to-be-synthesized image, so that plural to-be-synthesized images having the same number as the quotient are acquired;
(d) judging whether the image capturing process is completed, and
(e) synthesizing the plural to-be-synthesized images as a resulted image,
wherein if a judging result of the step (d) indicates that the step image capturing process is completed, the step (e) is performed, wherein if the judging result of the step (d) indicates that the step image capturing process is not completed, the remainder is set as an initial count value of the optical mouse sensor and the step (c) and the step (d) are repeatedly done.

* * * * *